(12) United States Patent
Yoshida et al.

(10) Patent No.: US 11,614,035 B2
(45) Date of Patent: Mar. 28, 2023

(54) SEAL SEGMENT AND ROTATING MACHINE

(71) Applicant: Mitsubishi Hitachi Power Systems, Ltd., Yokohama (JP)

(72) Inventors: Azumi Yoshida, Tokyo (JP); Hidekazu Uehara, Tokyo (JP); Kohei Ozaki, Tokyo (JP); Shin Nishimoto, Yokohama (JP); Tatsuro Furusho, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 94 days.

(21) Appl. No.: 16/967,577

(22) PCT Filed: Feb. 14, 2019

(86) PCT No.: PCT/JP2019/005279
§ 371 (c)(1),
(2) Date: Aug. 5, 2020

(87) PCT Pub. No.: WO2019/160013
PCT Pub. Date: Aug. 22, 2019

(65) Prior Publication Data
US 2021/0239050 A1 Aug. 5, 2021

(30) Foreign Application Priority Data
Feb. 19, 2018 (JP) .............................. JP2018-026749

(51) Int. Cl.
*F02C 7/28* (2006.01)
*F16J 15/3292* (2016.01)

(52) U.S. Cl.
CPC ............. *F02C 7/28* (2013.01); *F16J 15/3292* (2013.01)

(58) Field of Classification Search
CPC .... F16J 15/00; F16J 15/16; F16J 15/50; F16J 15/52; F16J 15/3288; F16J 15/3292; F02C 7/00; F02C 7/28
(Continued)

(56) References Cited

U.S. PATENT DOCUMENTS 5,110,033 A * 5/1992 Noone ................. F16J 15/3288
228/160
5,688,105 A 11/1997 Hoffelner
(Continued)

FOREIGN PATENT DOCUMENTS

CN 102362107 A 2/2012
CN 103842695 A 6/2014
(Continued)

OTHER PUBLICATIONS

International Search Report dated May 14, 2019, issued in counterpart Application No. PCT/JP2019/005279, with English Translation. (2 pages).
(Continued)

*Primary Examiner* — Nathan Cumar
(74) *Attorney, Agent, or Firm* — WHDA, LLP

(57) ABSTRACT

A seal segment comprises: a seal body having a plurality of thin-plate seal pieces that extend while being inclined forward in a rotational direction of a rotating shaft as the pieces draw farther inward in a radial direction of the rotating shaft, and that are layered in a circumferential direction of the rotating shaft; a pair of side plates extending in the circumferential direction so as to cover the seal body from both sides with respect to an axial direction of the rotating shaft; and a housing having a housing main body that accommodates the seal body while allowing the seal body to protrude inward in the radial direction, and an extending part that is provided to an end portion of the housing main body in the
(Continued)

circumferential direction, and that extends inward in the radial direction along an end surface of the seal body in the circumferential direction.

9 Claims, 6 Drawing Sheets

(58) Field of Classification Search
USPC .......................................................... 277/543
See application file for complete search history.

(56) References Cited

U.S. PATENT DOCUMENTS

| | | | |
|---|---|---|---|
| 6,105,966 A | 8/2000 | Turnquist et al. | |
| 6,343,792 B1* | 2/2002 | Shinohara | F16J 15/3292 277/355 |
| 8,100,406 B2 | 1/2012 | Wright | |
| 9,103,223 B2* | 8/2015 | Uehara | F16J 15/3292 |
| 2008/0309018 A1 | 12/2008 | Williams | |
| 2009/0315272 A1 | 12/2009 | Kasahara et al. | |
| 2011/0316237 A1 | 12/2011 | Uehara et al. | |
| 2014/0241877 A1 | 8/2014 | Uehara et al. | |
| 2017/0350510 A1* | 12/2017 | Uehara | F16J 15/3276 |
| 2019/0136766 A1 | 5/2019 | Yoshida et al. | |

FOREIGN PATENT DOCUMENTS

| | | |
|---|---|---|
| EP | 1013975 A1 | 6/2000 |
| JP | 04-318232 A | 11/1992 |
| JP | 2000-154874 A | 6/2000 |
| JP | 3692300 B2 | 9/2005 |
| JP | 2008-128276 A | 6/2008 |
| JP | 2008-261498 A | 10/2008 |
| JP | 5118552 B2 | 1/2013 |
| JP | 2017-203469 A | 11/2017 |

OTHER PUBLICATIONS

Written Opinion dated May 14, 2019, issued in counterpart Application No. PCT/JP2019/005279, with English Translation. (6 pages).

* cited by examiner

SEAL SEGMENT AND ROTATING MACHINE

TECHNICAL FIELD

The present invention relates to a seal segment and a rotating machine.

This application claims priority to Japanese Patent Application No. 2018-026749, filed in Japan on Feb. 19, 2018, the contents of which are incorporated herein by reference.

BACKGROUND ART

A shaft seal device is provided around a rotor in a rotating machine such as a gas turbine or a steam turbine in order to reduce a leakage amount of a working fluid flowing from a high pressure side to a low pressure side. As an example of the shaft seal device, a shaft seal device disclosed in PTL 1 is known.

The shaft seal device disclosed in PTL 1 has a housing and a plurality of thin-plate seal pieces engaging with the housing. The shaft seal device disclosed in PTL 1 is provided around a rotation surface to perform sealing around the rotation surface.

CITATION LIST

Patent Literature

[PTL 1] Japanese Unexamined Patent Application Publication No. 2008-261498

SUMMARY OF INVENTION

Technical Problem

In a case where a shaft seal device is provided around the rotation surface, the shaft seal device may have a plurality of segment structures divided toward a circumferential direction.

In this case, the flow of a fluid changes between the seal segments and fluttering occurs in the thin-plate seal pieces.

The invention provides a seal segment and a rotating machine which can suppress fluttering occurring in a thin-plate seal piece.

Solution to Problem

A seal segment according to a first aspect includes a seal body having a plurality of thin-plate seal pieces that extend while being inclined forward in a rotational direction of a rotating shaft as the pieces draw farther inward in a radial direction of the rotating shaft, and that are layered in a circumferential direction of the rotating shaft; a pair of side plates extending in the circumferential direction so as to cover the seal body from both sides with respect to an axial direction of the rotating shaft; and a housing having a housing main body that accommodates the seal body while allowing the seal body to protrude inward in the radial direction, and an extending part that is provided to an end portion of the housing main body in the circumferential direction, and that extends inward in the radial direction along an end surface of the seal body in the circumferential direction.

In this aspect, the housing has the extending part extending by being inclined inward in the radial direction along the end surface of the seal body in the circumferential direction. Therefore, the leakage of the fluid to the end surface of the seal body in the circumferential direction is suppressed. Accordingly, the seal segment can suppress fluttering occurring in the thin-plate seal piece due to the leakage of the fluid.

A seal segment according to a second aspect is the seal segment according to the first aspect in which the extending part extends while being inclined forward in the rotational direction of the rotating shaft as the extending part draws farther inward in the radial direction.

In this aspect, since the extending part is inclined in the same direction as the seal body, it is possible to reduce a gap between the extending part and the seal body. Therefore, the leakage of the fluid to the end surface of the seal body in the circumferential direction is suppressed. Accordingly, the seal segment can further suppress fluttering occurring in the thin-plate seal piece due to the leakage of the fluid.

A seal segment according to a third aspect is the seal segment according to the first or second aspect in which the extending part extends by being inclined relative to the radial direction more than the end surface of the seal body in the circumferential direction at a time of applying a pre-load.

In this aspect, since the extending part is inclined relative to the radial direction more than the end surface of the seal body in the circumferential direction at the time of applying a pre-load, an extending end of the extending part is less likely to come into contact with the end surface of the seal body in the circumferential direction. Therefore, an increase of the rigidity of the thin-plate seal piece, which is caused by the contact of the extending end of the extending part to the end surface of the seal body in the circumferential direction, is suppressed. Accordingly, the seal segment can suppress the wear of the thin-plate seal piece.

A seal segment according to a fourth aspect is the seal segment according to any one of the first to third aspects in which the extending part extends by being inclined relative to the radial direction more than an end surface of the side plate in the circumferential direction.

In this aspect, since the extending part is inclined relative to the radial direction more than the end surface of the side plate in the circumferential direction, the extending end of the extending part is less likely to come into contact with the end surface of the seal body in the circumferential direction. Therefore, an increase of the rigidity of the thin-plate seal piece, which is caused by the contact of the extending end of the extending part to the end surface of the seal body in the circumferential direction, is suppressed. Accordingly, the seal segment can suppress the wear of the thin-plate seal piece.

A seal segment according to a fifth aspect is the seal segment according to any one of the first to fourth aspects in which the housing has the extending part on each of both sides of the housing main body in the circumferential direction.

In this aspect, since the housing has the extending part on each of both the sides of the housing main body in the circumferential direction, the leakage of the fluid to both the end surfaces of the seal body in the circumferential direction is suppressed. Therefore, even in a case where there is a gap with the seal segment adjacent in the circumferential direction, the seal segment can suppress fluttering occurring in the thin-plate seal piece due to the leakage of the fluid on both sides of the housing main body in the circumferential direction.

A seal segment according to a sixth aspect is the seal segment according to any one of the first to fifth aspects in which the housing has the extending part on one of both sides of the housing main body in the circumferential direction.

In this aspect, since the extending part is provided only one side of the housing, the seal segment can suppress fluttering occurring in the thin-plate seal piece due to the leakage of the fluid at least on one of both the sides of the housing main body in the circumferential direction with a simple structure. Furthermore, in a case where a plurality of seal segments are arranged in the circumferential direction, the seal segment can suppress fluttering occurring in the thin-plate seal piece due to the leakage of the fluid on both the sides of the housing main body in the circumferential direction.

A rotating machine according to a seventh aspect includes a plurality of the seal segments according to any one of the first to sixth aspects, in which the plurality of seal segments are arranged along the circumferential direction.

In this aspect, each seal segment has the extending part extending by being inclined inward in the radial direction along the end surface of the seal body in the circumferential direction. Therefore, the leakage of the fluid to each seal segment is suppressed. Accordingly, the rotating machine can suppress fluttering occurring in the thin-plate seal piece due to the leakage of the fluid.

Advantageous Effects of Invention

According to an aspect of the invention, it is possible to suppress fluttering occurring in a thin-plate seal piece.

DESCRIPTION OF EMBODIMENTS

Hereinafter, embodiments of the invention will be described with reference to the drawings.

First Embodiment

Hereinafter, a first embodiment of the invention will be described with reference to FIGS. 1 to 5.

In the embodiment, an example in which a shaft seal device 10 is applied to a gas turbine (rotating machine) 1 is described.

Figure 1:
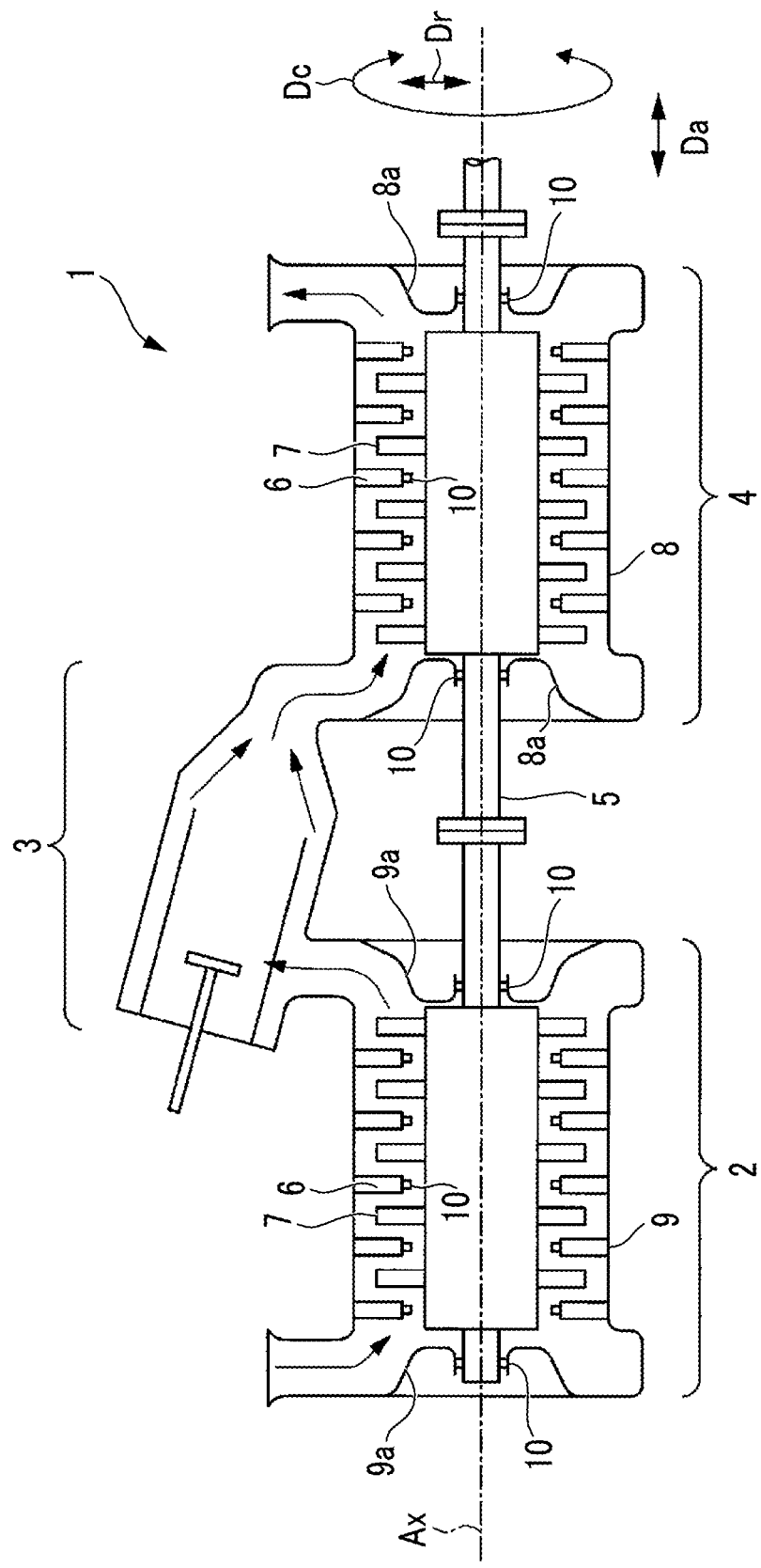
FIG. 1 is a schematic entire configuration diagram of a gas turbine (rotating machine) according to a first embodiment of the invention.

The gas turbine 1 illustrated in FIG. 1 has a compressor 2 that takes in and compresses a large amount of air, and a combustor 3 that mixes fuel with the air compressed by the compressor 2 and burns the mixture. The gas turbine 1 further has a turbine 4 that rotates, and a rotor 5 (rotating shaft) that transmits a part of power for rotating the turbine 4 to the compressor 2 to rotate the compressor 2.

The turbine 4 rotates by converting thermal energy of a combustion gas into rotational energy with the introduction of the combustion gas generated in the combustor 3 into the turbine 4.

In the following description, a direction in which an axis Ax of the rotor 5 extends is referred to as an "axial direction Da", a circumferential direction of the rotor 5 is referred to as a "circumferential direction Dc", a radial direction of the rotor 5 is referred to as a "radial direction Dr", and a rotational direction of the rotor 5 is referred to as a "rotational direction Bc".

In the gas turbine 1 with the above-described configuration, the turbine 4 converts the thermal energy of the combustion gas into the mechanical rotational energy by blowing the combustion gas to rotor blades 7 provided on the rotor 5 to generate power. In the turbine 4, in addition to a plurality of rotor blades 7 on the rotor 5 side, a plurality of stator blades 6 are provided on a casing 8 side of the turbine 4, and the rotor blades 7 and the stator blades 6 are alternately arranged in the axial direction Da.

The rotor blade 7 receives a pressure of the combustion gas flowing in the axial direction Da to cause the rotor 5 to rotate around the axis, and the rotational energy applied to the rotor 5 is used by being extracted from the shaft end. The shaft seal device 10 is provided between the stator blade 6 and the rotor 5, as a shaft seal for reducing a leakage amount of the combustion gas leaking from the high pressure side to the low pressure side.

The compressor 2 is coaxially connected to the turbine 4 by the rotor 5, and compresses the outside air by using the rotation of the turbine 4 to supply the compressed air to the combustor 3. Similar to the turbine 4, even in the compressor 2, a plurality of rotor blades 7 are provided on the rotor 5, a plurality of stator blades 6 are provided on a casing 9 side of the compressor 2, and the rotor blades 7 and the stator blades 6 are alternately arranged in the axial direction Da. In addition, the shaft seal device 10 for reducing a leakage amount of the compressed air leaking from the high pressure side to the low pressure side is provided between the stator blade 6 and the rotor 5.

Further, a bearing portion 9a of the casing 9 of the compressor 2 which supports the rotor 5 and a bearing portion 8a of the casing 8 of the turbine 4 which supports the rotor 5 are provided with the shaft seal device 10 that prevents the compressed air or the combustion gas from leaking from the high pressure side to the low pressure side.

Here, the shaft seal device 10 according to the embodiment is not limited to the application to the gas turbine 1. For example, the shaft seal device 10 can be widely applied to general rotating machines that convert energy into work by the rotation of a shaft and the flowing of a fluid, such as large fluid machines, for example, a steam turbine, a compressor, a water turbine, a chiller, and a pump. In this case, the shaft seal device 10 can be widely used for suppressing the flowing of the fluid in the axial direction Da.

Figure 2:
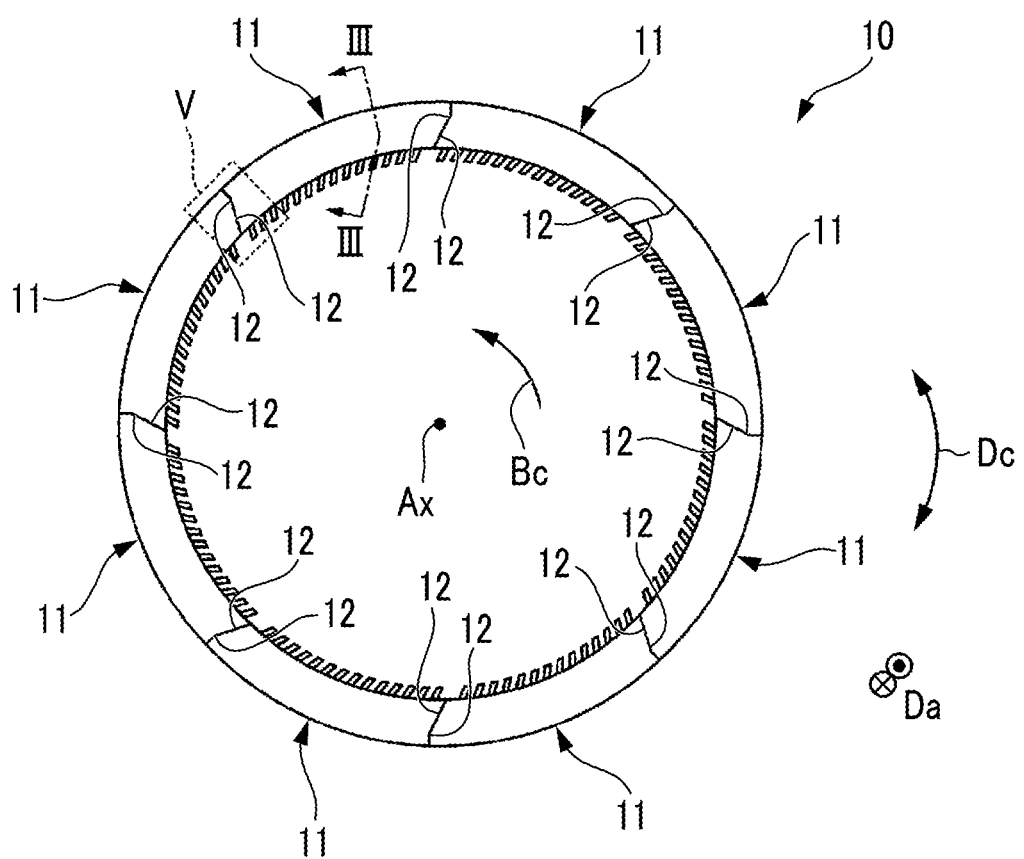
FIG. 2 is a schematic configuration diagram of a shaft seal device according to the first embodiment of the invention.

Next, the configuration of the shaft seal device 10 provided in the gas turbine 1 with the above-described configuration will be described with reference to the drawings. FIG. 2 is a diagram viewed from the axial direction Da. As illustrated in FIG. 2, the shaft seal device 10 includes a plurality of (eight in the embodiment) seal segments 11 arranged along the circumferential direction Dc. The plurality of seal segments 11 surround the peripheral surface of the rotor 5. The plurality of seal segments 11 extend in an arc shape, and are disposed in an annular shape along the circumferential direction Dc.

In the embodiment, circumferential end portions 12 and 12 of the adjacent seal segments 11 are disposed without a gap.

The configuration of each seal segment 11 will be described with reference to FIG. 3. The cut position of the cross section of the seal segment 11 illustrated in FIG. 3 corresponds to the position of line illustrated in the seal segment 11 of FIG. 2.

Each seal segment 11 includes a housing 30.

Each seal segment 11 is provided between the rotor 5 and the stator blade 6. Each seal segment 11 is installed for suppressing the leakage of a working fluid in an annular space between the rotor 5 and the stator blade 6.

Each seal segment 11 is provided also between the rotor 5 and the rotor blade 7. Each seal segment 11 is installed for suppressing the leakage of a working fluid in an annular space between the rotor 5 and the rotor blade 7.

Each seal segment 11 is provided between the rotor 5 and the bearing portion 8a and between the rotor 5 and the bearing portion 9a. Each seal segment 11 is installed for suppressing the leakage of a working fluid in an annular space between the rotor 5 and the bearing portion 8a and in an annular space between the rotor 5 and the bearing portion 9a.

The seal segment 11 further includes a seal body 13, retainers 21 and 22, and a pair of side plates 25. In the embodiment, the seal segment 11 has a high pressure-side side plate 23 and a low pressure-side side plate 24 as the pair of side plates 25.

The seal body 13, the retainers 21 and 22, and the side plates 25 are accommodated in the housing 30.

The seal body 13 includes a plurality of thin-plate seal pieces 20 which are plentifully arranged along the circumferential direction Dc with a small gap therebetween and are metal members. The plurality of thin-plate seal pieces 20 are layered along the circumferential direction Dc (rotational direction Bc) in a partial region of the rotor 5 in the circumferential direction Dc, and have an arc shape as a whole when viewed from the axial direction Da.

The retainers 21 and 22 are configured to sandwich the thin-plate seal pieces 20 from both sides in an outer peripheral-side base end 27 of the thin-plate seal piece 20. The cross section of the retainers 21 and 22 in the circumferential direction Dc is formed in a substantially C-shape. Further, the cross section of the retainers 21 and 22 in the axial direction Da is formed in an arc shape.

The high pressure-side side plate 23 is sandwiched between the retainer 21 and a high pressure-side edge, which faces the high pressure-side region, of the thin-plate seal piece 20. Thus, the high pressure-side side plate 23 extends in the radial direction Dr and the circumferential direction Dc so as to cover high pressure-side side surfaces of the plurality of thin-plate seal pieces 20 from the high pressure side in the axial direction Da.

The low pressure-side side plate 24 is sandwiched between the retainer 22 and a low pressure-side edge, which faces the low pressure-side region, of the thin-plate seal piece 20. Thus, the low pressure-side side plate 24 extends in the radial direction Dr and the circumferential direction Dc so as to cover low pressure-side side surfaces of the plurality of thin-plate seal pieces 20 from the low pressure side in the axial direction Da.

In the seal body 13 with the above-described configuration, the thin-plate seal piece 20 is configured by a substantially T-shaped thin steel plate of which the width (width in the axial direction Da) on the inner peripheral side is smaller than the width (width in the axial direction Da) of the outer peripheral-side base end 27. Notches 20a and 20b are formed on both side edges of the thin-plate seal piece 20 at a position where the width is small.

The plurality of adjacent thin-plate seal pieces 20 are fixedly connected to each other on the outer peripheral-side base end 27 by welding, for example.

The thin-plate seal piece 20 has a predetermined rigidity based on the plate thickness, in the circumferential direction Dc. Further, the thin-plate seal piece 20 is fixed by the retainers 21 and 22 such that the angle formed between the thin-plate seal piece 20 and the peripheral surface of the rotor 5 is an acute angle in the rotational direction Bc.

Accordingly, the thin-plate seal piece 20 extends forward in the rotational direction Bc as the pieces draw farther inward in the radial direction Dr.

In the seal segment 11 with the above-described configuration, when the rotor 5 is stationary, the distal end of each thin-plate seal piece 20 is in contact with the rotor 5. When the rotor 5 is rotated, the distal end of the thin-plate seal piece 20 is floated from the outer periphery of the rotor 5 to be in non-contact with the rotor 5 due to the dynamic pressure effect caused by the rotation of the rotor 5. Therefore, in the seal segment 11, the wear of each thin-plate seal piece 20 is suppressed, and the seal life is extended.

The high pressure-side side plate 23 has a fitting step portion 23a on the outer peripheral side. The width of the fitting step portion 23a in the axial direction Da is larger than the width of the high pressure-side side plate 23 on the inner peripheral side in the axial direction Da.

The low pressure-side side plate 24 has a fitting step portion 24a on the outer peripheral side. The width of the fitting step portion 24a in the axial direction Da is larger than the width of the low pressure-side side plate 24 on the inner peripheral side in the axial direction Da.

The fitting step portions 23a and 24a are respectively fitted to the notches 20a and 20b of the thin-plate seal piece 20.

Further, the retainer 21 has a concave groove 21a on a surface facing one side edge (side edge on the high pressure side) of the outer peripheral-side base end 27 of the plurality of thin-plate seal pieces 20. Further, the retainer 22 has a concave groove 22a on a surface facing the other side edge (side edge on the low pressure side) of the outer peripheral-side base end 27 of the plurality of thin-plate seal pieces 20. The fitting step portion 23a of the high pressure-side side plate 23 and the fitting step portion 24a of the low pressure-side side plate 24 are fitted to the notches 20a and 20b. In the plurality of thin-plate seal pieces 20 to which the fitting step portion 23a and the fitting step portion 24a are fitted, one side edge (side edge on the high pressure side) on the outer peripheral side is fitted to the concave groove 21a of the retainer 21. Further, the other side edge (side edge on the low pressure side) on the outer peripheral side is fitted to the concave groove 22a of the retainer 22. With this configuration, each thin-plate seal piece 20 is fixed to the retainers 21 and 22.

An annular concave groove 31 is formed on an inner peripheral wall surface of the housing 30. The annular concave groove 31 has a shape in which a step is provided on side surfaces facing the one side edge (side edge on the high pressure side) and the other side edge (side edge on the low pressure side) of the thin-plate seal piece 20 such that the width on the outer peripheral side is greater than the width on the inner peripheral side in the axial direction of the rotor 5. The thin-plate seal piece 20, the retainers 21 and 22, the high pressure-side side plate 23, and the low pressure-side side plate 24 are fitted to the concave groove 31 of the housing 30 such that the surfaces of the retainers 21 and 22 facing inner peripheral side are in contact with the surface of the step facing the outer peripheral side. An inner peripheral-side end portion 26 of the thin-plate seal piece 20 protrudes to the rotor 5 side more than the high pressure-side side plate 23. On the other hand, the inner peripheral-side end portion 26 of the thin-plate seal piece 20 protrudes to the rotor 5 side more than the low pressure-side side plate 24, but the amount of protrusion thereof is set to be greater than that on the high pressure side. That is, the thin-plate seal piece 20 is more exposed to a working fluid G on the low pressure side than on the high pressure side. In other words, the high pressure-side side plate 23 shields a wide range of the side surface of the thin-plate seal piece 20 from the working fluid G.

The high pressure-side side plate 23 comes into close contact with a side surface 20c of the thin-plate seal piece 20 by the pressure of the flow of the working fluid G to suppress that the working fluid G largely flows into the gap between the plurality of thin-plate seal pieces 20. Thus, the high pressure-side side plate 23 generates an upward flow from the inner peripheral-side end portion 26 toward the outer peripheral-side base end 27 at a gap portion between the plurality of thin-plate seal pieces 20 to float the inner peripheral-side end portion 26 of the thin-plate seal piece 20 by the fluid force, thereby making a non-contact state.

Further, the low pressure-side side plate 24 is pressed by the high pressure-side side plate 23 and the thin-plate seal piece 20 to come into close contact with a low pressure-side wall surface 32 of the inner peripheral wall surface of the housing 30. Since the low pressure-side side plate 24 has an inner diameter larger than the high pressure-side side plate 23, the flow in the gap between the plurality of thin-plate seal pieces 20 is in a flow state in which floating is easy.

Figure 3:
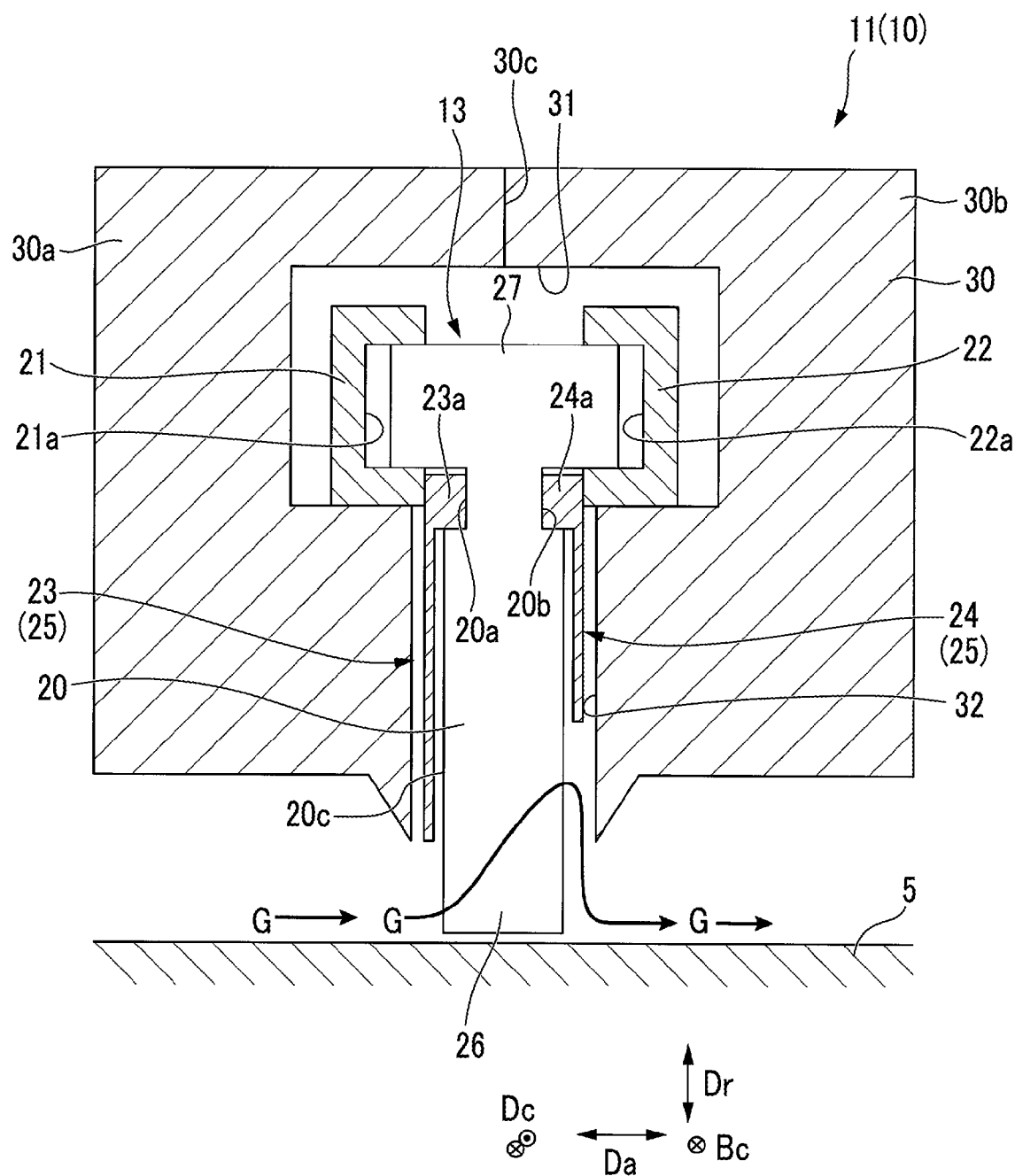
FIG. 3 is a cross-sectional view of a seal segment according to the first embodiment of the invention in a circumferential direction.
Figure 4:
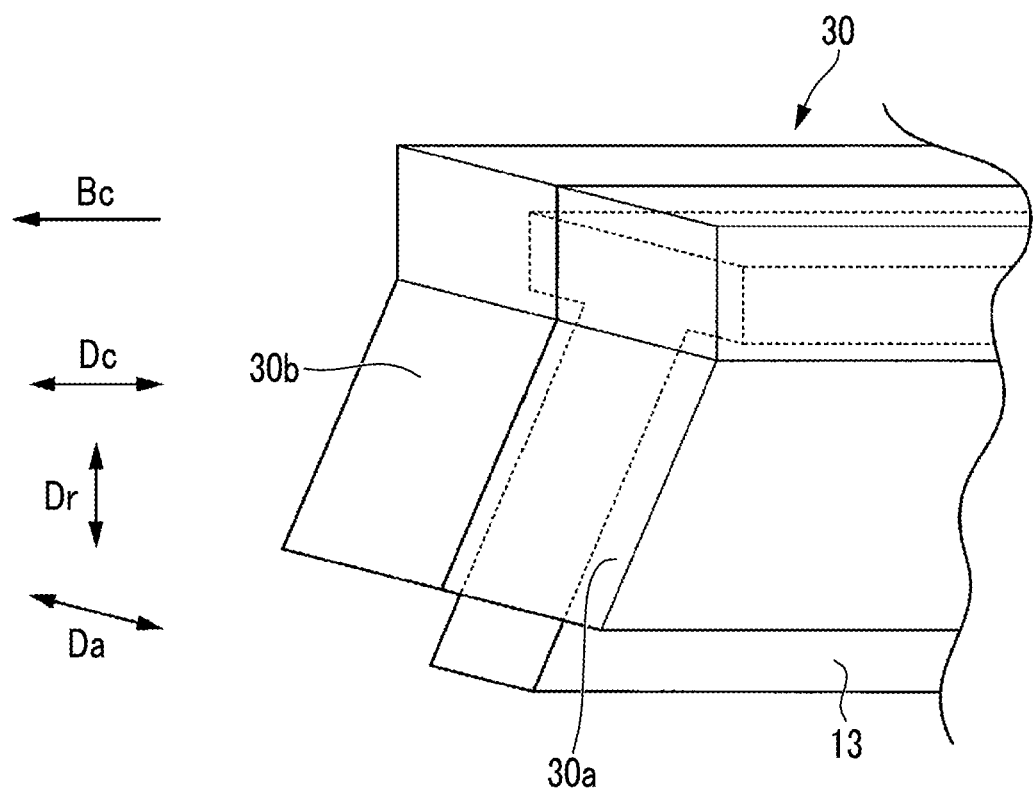
FIG. 4 is a perspective view of a principal part of the seal segment according to the first embodiment of the invention.

As illustrated in FIGS. 3 and 4, the housing 30 has a division structure in which the housing 30 is divided into a first member 30a and a second member 30b in the axial direction Da. The housing 30 has the first member 30a on the high pressure side in the axial direction Da and the second member 30b on the low pressure side in the axial direction Da.

The first member 30a and the second member 30b are aligned to sandwich the seal body 13 from both sides in the axial direction Da so that the housing 30 accommodates the seal body 13.

In the embodiment, the housing 30 is divided by a flat surface 30c.

For convenience of describing the housing 30, in one seal segment 11, only the housing 30 and the seal body 13 is illustrated in FIG. 4 for convenience.

The housing 30 of the embodiment will be described in detail with reference to FIG. 5.

Figure 5:
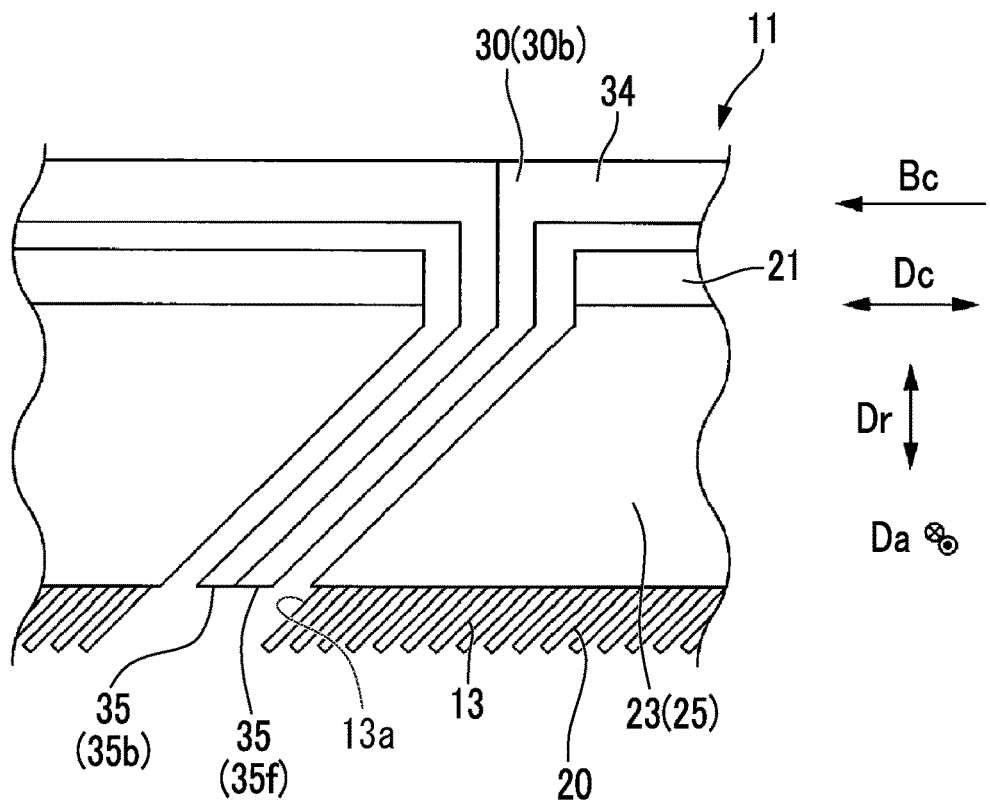
FIG. 5 is a side view of the principal part of the seal segment according to the first embodiment of the invention.

As illustrated in FIG. 5, the housing 30 has a housing main body 34 and an extending part 35. In the embodiment, since the housing 30 is divided into the first member 30a and the second member 30b as described above, each of the first member 30a and the second member 30b has the housing main body 34 and the extending part 35.

For convenience of describing the structure of the housing 30, in one seal segment 11, a configuration in a state where the first member 30a of the housing 30 is removed is illustrated in FIG. 5 for convenience.

The housing main body 34 and the extending part 35 are integrally molded. In the embodiment, since the housing 30 is divided into the first member 30a and the second member 30b as described above, in each of the first member 30a and the second member 30b, a part constituting the housing main body 34 and a part constituting the extending part 35 are integrally molded.

The housing main body 34 accommodates the seal body 13 while allowing the seal body 13 to protrude inward in the radial direction Dr.

The extending part 35 is provided to an end portion of the housing main body 34 in the circumferential direction Dc.

The extending part 35 extends inward in the radial direction Dr along the end surface of the seal body 13 in the circumferential direction Dc. In the embodiment, the extending part 35 extends while being inclined forward in the rotational direction Bc as the extending part draws farther inward in the radial direction Dr. In particular, in the embodiment, the extending part 35 is inclined relative to the radial direction Dr at the same inclination angle as the end surface of the seal body 13 in the circumferential direction Dc.

In the embodiment, the housing 30 has the extending part 35 on each of both the sides of the housing main body 34 in the circumferential direction Dc. That is, the housing 30 has a first extending part 35f on the front side in the rotational direction Bc and a second extending part 35b on the rear side in the rotational direction Bc.

The first extending part 35f and the second extending part 35b are inclined at the same inclination angle relative to the radial direction Dr. Therefore, in a case where the plurality of seal segments 11 are disposed in an annular shape along the circumferential direction Dc, the extending part 35 is in surface contact with the entire extending part 35 of the adjacent seal segment 11.

The operations and effects of the embodiment will be described.

In the embodiment, the housing 30 has the extending part 35 extending inward in the radial direction Dr along the end surface of the seal body 13 in the circumferential direction Dc. Therefore, the leakage of the fluid to the end surface of the seal body 13 in the circumferential direction Dc is suppressed. Accordingly, the seal segment 11 can suppress fluttering occurring in the thin-plate seal piece 20 due to the leakage of the fluid.

In the embodiment, since the extending part 35 is inclined in the same direction as the seal body 13, it is possible to reduce the gap between the extending part 35 and the seal body 13. Therefore, the leakage of the fluid to the end surface of the seal body 13 in the circumferential direction Dc is further suppressed.

In the embodiment, the housing 30 has the extending part 35 on each of both the sides of the housing main body 34 in the circumferential direction Dc so that the leakage of the fluid to the both end surfaces of the seal body 13 in the circumferential direction Dc is suppressed. Therefore, even in a case where there is a gap with the seal segment 11 adjacent in the circumferential direction Dc, the seal segment 11 can suppress the leakage of the fluid on both the sides of the housing main body 34 in the circumferential direction.

In particular, in a case where the shaft seal device 10 is incorporated into the gas turbine 1, in many cases, the shaft seal device 10 has a division structure in which the shaft seal device 10 is divided in the circumferential direction Dc similar to the plurality of seal segments 11.

When the shaft seal device 10 has a division structure, since the side plate 25 is also divided at a division part, it becomes difficult for the side plate 25 to be in close contact with the seal body 13, the flow inside the seal body 13 is changed, and an appropriate force for floating may not be obtained in some cases. In a case where the floating characteristics deteriorate, the wear of the seal body 13 advances.

Further, at the division part, there is a part where the side plate 25 does not cover the side surface of the seal body 13, which allows the flow of the fluid into the seal body 13 in the axial direction Da. Therefore, fluttering is likely to occur.

In contrast, in the embodiment, the shape of the circumferential end portion 12 of the housing 30 has a shape diagonally cut relative to the radial direction in accordance with the shape of the seal body 13. Further, the housing 30 fills the division part. Therefore, the leakage of the fluid to the division part is suppressed.

Accordingly, the shaft seal device 10 can suppress unexpected pressure balance due to the leakage to the division part, and can reduce the wear of the division part.

Furthermore, in the embodiment, the extending part 35 extends up to the contact surfaces of the seal segments 11. Therefore, even in a case where the thin-plate seal piece 20 protrudes in the circumferential direction Dc from the side plate 25 when the plurality of seal segments 11 are arranged, it is possible to suppress that the protruding thin-plate seal piece 20 comes into contact with the thin-plate seal piece 20 of the adjacent seal segment 11 by the extending part 35.

Second Embodiment

Hereinafter, a second embodiment of the invention will be described with reference to FIG. 6.

The second embodiment is different from the first embodiment in that an extending part of a seal segment 111 of the second embodiment is further inclined relative to the radial direction Dr. The other points are the same as those in the first embodiment.

Figure 6:
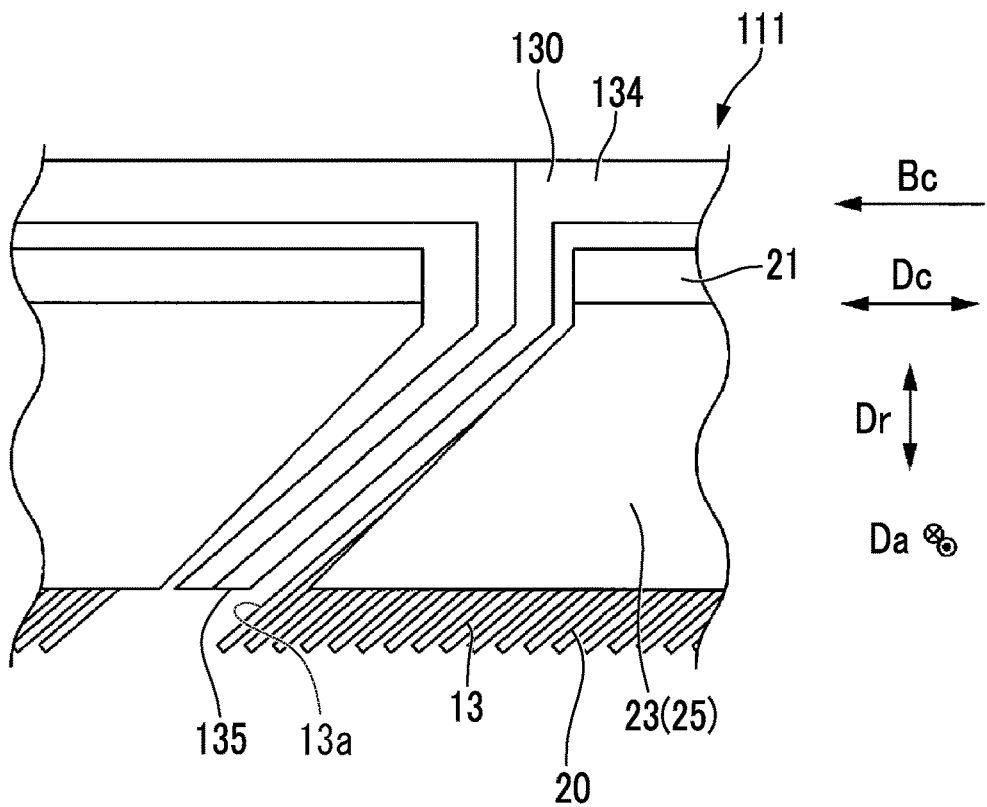
FIG. 6 is a side view of a principal part of a seal segment according to a second embodiment of the invention.

As illustrated in FIG. 6, the seal segment 111 includes a housing 130.

The housing 130 has a housing main body 134 and an extending part 135.

The extending part 135 extends by being inclined relative to the radial direction Dr at an angle greater than that of the end surface of the seal body 13 in the circumferential direction Dc when a pre-load is applied. In this case, the extending part 135 is configured by obtaining in advance an inclination angle of the end surface of the seal body 13 in the circumferential direction Dc when a pre-load is applied.

The operations and effects of the embodiment will be described.

In a case where the extending part is inclined relative to the radial direction Dr at the same inclination angle as the end surface of the seal body 13 in the circumferential direction Dc, when a pre-load is applied to the seal body 13, the extending part comes into contact with the seal body 13. Therefore, the rigidity of the seal body 13 may increase.

In such a case, if the extending part is inclined in advance relative to the radial direction Dr at an angle greater than that of the end surface of the seal body 13 in the circumferential direction Dc, it is possible to prevent the rigidity from increasing due to contact.

In the embodiment, as illustrated in FIG. 6, the extending part 135 is configured to extend by being inclined relative to the radial direction Dr more than the end surface of the seal body 13 in the circumferential direction Dc when a pre-load is applied.

According to the embodiment, even when a pre-load is applied, the extending part 135 is less likely to come into contact with the end surface of the seal body 13 in the circumferential direction Dc.

Accordingly, the contact of the extending part 135 with respect to the seal body 13 is suppressed.

As a modification example of the embodiment, a configuration in which the inclination angle of the extending part 135 relative to the radial direction Dr is greater than that of the end surface of the side plate 25 in the circumferential direction Dc may be adopted.

In general, the side plate 25 has a shape of covering the side surface of the seal body 13 in the circumferential direction Dc. Therefore, if the extending part 135 is inclined relative to the radial direction Dr more than the end surface of the side plate 25 in the circumferential direction Dc, even in a case where a pre-load is applied to the seal body 13, the extending part 135 is less likely to come into contact with the end surface of the seal body 13 in the circumferential direction Dc.

Accordingly, also in this case, the extending part 135 is less likely to come into contact with the end surface of the seal body 13 in the circumferential direction Dc, and the contact of the extending part 135 to the seal body 13 is suppressed.

Modification Example

In the embodiments, the housing main body accommodates the seal body while allowing the seal body to protrude inward in the radial direction Dr. As a modification example, the housing main body may further accommodate a side seal while allowing the side seal to protrude inward in the radial direction Dr.

In the embodiments, the housing has the extending part on each of both the sides of the housing main body in the circumferential direction Dc. As a modification example, the housing may have the extending part only on one side of both the sides of the housing main body in the circumferential direction. That is, the housing may have the extending part only on the front side in the rotational direction Bc or may have the extending part only on the rear side in the rotational direction Bc.

In the embodiments, the circumferential end portions of the adjacent seal segments are disposed without a gap. As a modification example, the circumferential end portions of the adjacent seal segments may be disposed with a gap. In this case, the extending part has a gap without being in surface contact with the extending part of the adjacent seal segment.

In the embodiments, the first extending part and the second extending part are inclined at the same inclination angle relative to the radial direction Dr. As a modification example, the first extending part and the second extending part may be inclined at different inclination angles relative to the radial direction Dr. In this case, the extending part is partially in contact with the extending part of the adjacent seal segment without being in surface contact with the entire extending part of the adjacent seal segment.

In the embodiments, the housing main body and the extending part are integrally molded.

As a modification example, the extending part may be attached to the housing main body without being integrally molded. For example, the extending part may be attached to the housing main body by brazing or welding.

As another modification example, the extending part may be detachably attached to the housing main body without being integrally molded. For example, a configuration in which the housing main body and the extending part are screwed to each other may be adopted, or a configuration in which the extending part is fitted to the housing main body may be adopted.

In the embodiments, the housing is divided into the first member and the second member by a flat surface, but may be configured as a housing 230 as a modification example.

Figure 7:
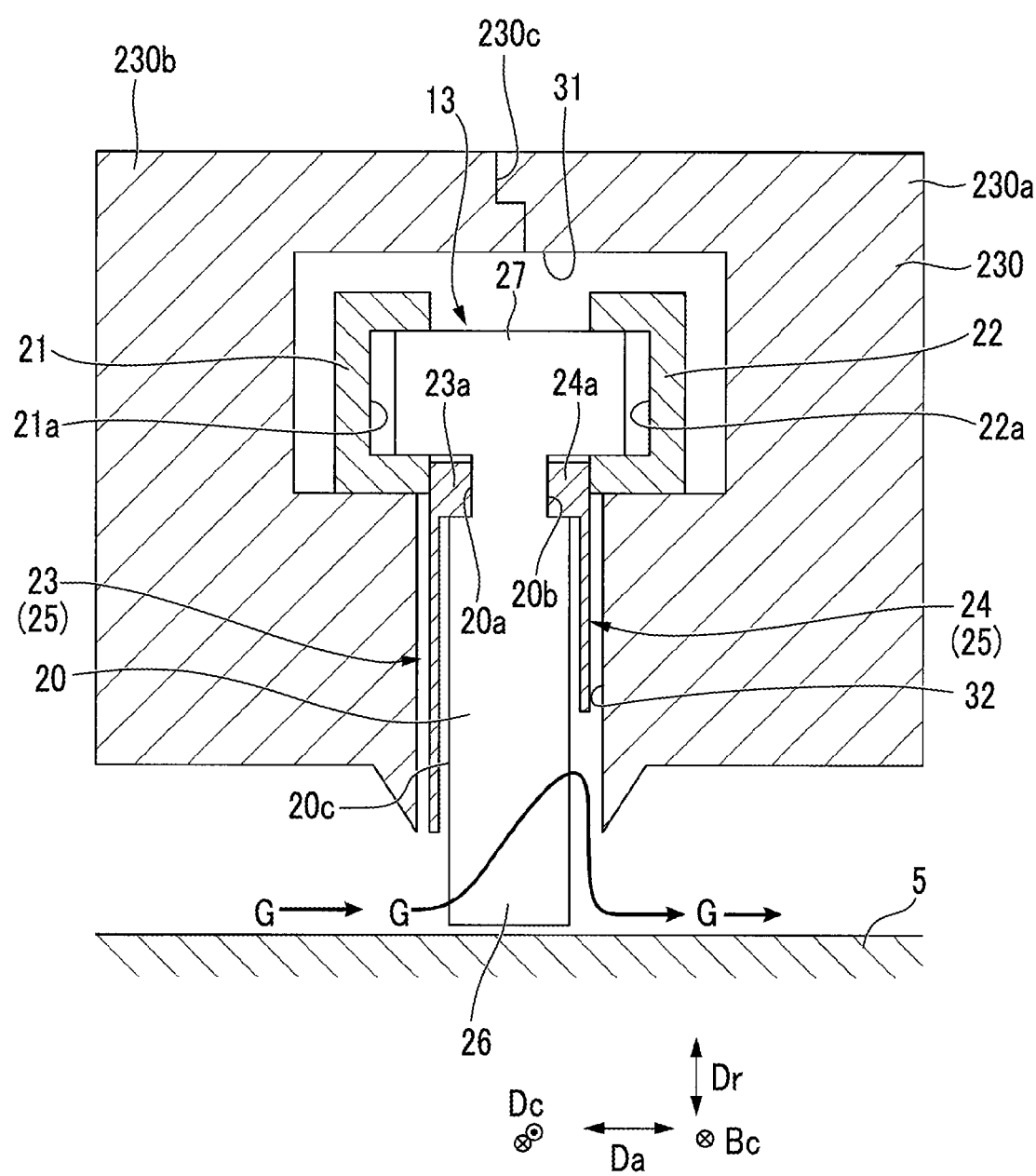
FIG. 7 is a cross-sectional view of a seal segment according to a modification example of the embodiments of the invention in a circumferential direction.

As illustrated in FIG. 7, the housing 230 is divided into a first member 230a and a second member 230b by a stepped surface 230c. Therefore, the first member 230a and the second member 230b are fitted to each other in the stepped surface 230c. Accordingly, the seal segment of the modification example has a structure in which the first member 230a and the second member 230b are unlikely to be displaced. Further, in the seal segment of the modification example, it is easy to assemble the first member 230a and the second member 230b.

INDUSTRIAL APPLICABILITY

According to an aspect of the invention, it is possible to suppress fluttering occurring in a thin-plate seal piece.

REFERENCE SIGNS LIST

1: gas turbine (rotating machine)
2: compressor
3: combustor
4: turbine
5: rotor
6: stator blade
7: rotor blade
8: casing
8a: bearing portion
9: casing
9a: bearing portion
10: shaft seal device
11: seal segment
12: circumferential end portion
13: seal body
20: thin-plate seal piece
20a: notch
20b: notch
20c: side surface
21: retainer
21a: concave groove
22: retainer
22a: concave groove
23: high pressure-side side plate
23a: fitting step portion
24: low pressure-side side plate
24a: fitting step portion
25: side plate
26: inner peripheral-side end portion
27: outer peripheral-side base end
30: housing
30a: first member
30b: second member
30c: flat surface
31: concave groove
32: low pressure-side wall surface
34: housing main body
35: extending part
35b: second extending part
35f: first extending part
111: seal segment
130: housing
134: housing main body
135: extending part
230: housing
230a: first member
230b: second member
230c: stepped surface
Ax: axis
Bc: rotational direction
Da: axial direction
Dc: circumferential direction
Dr: radial direction
G: working fluid

The invention claimed is:

1. A seal segment comprising:
a seal body having a plurality of thin-plate seal pieces that extend while being inclined forward in a rotational direction of a rotating shaft as the pieces draw farther inward in a radial direction of the rotating shaft, and that are layered in a circumferential direction of the rotating shaft;
a pair of side plates extending in the circumferential direction so as to cover the seal body from both sides with respect to an axial direction of the rotating shaft; and
a housing having a housing main body that accommodates the seal body while allowing the seal body to protrude inward in the radial direction, and an extending part that is provided to an end portion of the housing main body in the circumferential direction, and that extends inward in the radial direction along an end surface of the seal body, the end surface facing the circumferential direction,
wherein the end surface and the extending part face each other.

2. The seal segment according to claim 1,
wherein the extending part extends while being inclined forward in the rotational direction of the rotating shaft as the extending part draws farther inward in the radial direction.

3. The seal segment according to claim 1,
wherein the extending part extends by being inclined relative to the radial direction more than the end surface of the seal body at a time of applying a pre-load.

4. The seal segment according to claim 1,
wherein the extending part extends by being inclined relative to the radial direction more than an end surface of the side plate in the circumferential direction.

5. The seal segment according to claim 1,
wherein the housing has the extending part on each of both sides of the housing main body in the circumferential direction.

6. The seal segment according to claim 1,
wherein the housing has the extending part only on one side of both sides of the housing main body in the circumferential direction.

7. A rotating machine comprising:
a plurality of the seal segments according to claim 1,
wherein the plurality of seal segments are arranged along the circumferential direction.

8. A seal segment comprising:
a seal body having a plurality of thin-plate seal pieces that extend while being inclined forward in a rotational direction of a rotating shaft as the pieces draw farther inward in a radial direction of the rotating shaft, and that are layered in a circumferential direction of the rotating shaft;

a pair of side plates extending in the circumferential direction so as to cover the seal body from both sides with respect to an axial direction of the rotating shaft; and a housing having a housing main body that accommodates the seal body while allowing the seal body to protrude inward in the radial direction, and an extending part that is provided to an end portion of the housing main body in the circumferential direction, and that extends inward in the radial direction along an end surface of the seal body in the circumferential direction, wherein the extending part extends by being inclined relative to the radial direction more than the end surface of the seal body in the circumferential direction at a time of applying a pre-load.

9. A rotating machine comprising:

a plurality of the seal segments according to claim 8, wherein the plurality of seal segments are arranged along the circumferential direction.

\* \* \* \* \*